United States Patent [19]

Nye

[11] Patent Number: 5,153,300
[45] Date of Patent: Oct. 6, 1992

[54] DIHYDROXY-META-TERPHENYL POLYESTERS AND METHOD OF MAKING

[75] Inventor: Susan A. Nye, Feura Bush, N.Y.

[73] Assignee: General Electric Company, Schenectady, N.Y.

[21] Appl. No.: 731,228

[22] Filed: Jul. 17, 1991

[51] Int. Cl.$^5$ ............ C08G 63/00; C08G 63/02; C08G 65/38; C08G 75/00
[52] U.S. Cl. ............................ 528/176; 528/125; 528/171; 528/173; 528/174; 528/190; 528/193; 528/219
[58] Field of Search ........... 528/176, 190, 193, 219, 528/125, 171, 173, 174, 191

[56] References Cited

U.S. PATENT DOCUMENTS

| | | | |
|---|---|---|---|
| 3,160,602 | 12/1964 | Kantor et al. | 528/176 |
| 3,948,856 | 4/1976 | Stackman | 528/176 |
| 4,154,922 | 5/1979 | Donohue | 528/183 |
| 4,412,058 | 10/1983 | Siemonke | 528/191 |
| 4,870,153 | 9/1989 | Matzner et al. | 528/125 |
| 4,970,286 | 11/1990 | Genz et al. | 528/193 |

FOREIGN PATENT DOCUMENTS

| | | |
|---|---|---|
| 0028030 | 10/1980 | Fed. Rep. of Germany . |
| 63-43924 | 2/1988 | Japan . |
| 0001340 | 9/1978 | United Kingdom . |

OTHER PUBLICATIONS

Article–Journal of Polymer Science, vol. XXVIII, pp. 179–184 (1958)–Properties of Polyesters of Bisphenols and Dicarboxylic Acids, Max Levine and S. C. Temin.
Article–Journal of Polymer Science: Part A, vol. 2, pp. 437–459 (1964)–Linear Condensation Polymers from Phenolphthalein and Related Compounds, P. W. Morgan.
Article–European Polymer Journal, vol. 6, pp. 1339–1346 (1970)–Synthesis and Properties of Polyesters Based on Substituted Bisphenols, H. G. Weyland, C. A. M. Hoefs, K. Yntema and W. J. Mijs.
Article–Journal of Polymer Science, vol. XL, pp. 339–405 (1959)–Interfacial Polycondensation, X. Polyphenyl Esters, William M. Eareckson, III.

*Primary Examiner*—John Kight, III
*Assistant Examiner*—T. Mosley
*Attorney, Agent, or Firm*—William A. Teoli; James C. Davis, Jr.; William H. Pittman

[57] ABSTRACT

Aromatic polyester copolymers are provided consisting essentially of dihydroxy-meta-terphenyl units, and bisphenol A units chemically combined with aromatic diacid units such as isophthaloyl units, terephthaloyl units and mixtures thereof. Polyesters have been found to have a high glass transition temperature and stability up to 475° C.

5 Claims, No Drawings

DIHYDROXY-META-TERPHENYL POLYESTERS AND METHOD OF MAKING

CROSS REFERENCE TO RELATED APPLICATIONS

Reference is made to copending application, Ser. No. 07/651,171, filed Jan. 31, 1991 and Ser. No. 07/731,603 concurrently herewith.

BACKGROUND OF THE INVENTION

The present invention relates to aromatic polyesters comprising dihydroxy-meta-terphenyl ester units. More particularly, the present invention relates to polyester copolymers of ester units of dihydroxy-meta-terphenyl compounds and other bisphenols such as bisphenol A esterified with aromatic diacid units, such as terephthalic acid units, isophthalic acid units or a mixture of such aromatic diacid units.

In copending application Ser. No. 07/651,171, polyether polymers are described derived from 4,4″dihydroxy-m-terphenyls having the formula,

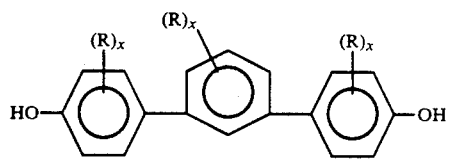
(1)

where R can be the same or different and a member selected from the class consisting of nitro, $C_{(1-8)}$ alkoxy and $C_{(1-13)}$ monovalent hydrocarbon and x is a whole number equal to 0 to 4 inclusive. It has been found that polyether polymers having higher processing temperatures as shown by higher glass transition temperatures (Tg) can be made by reacting the m-terphenyl diols of formula (1), under alkaline conditions with at least one halogen containing compound such as bis(4-halophenyl)sulfone and optionally with at least one dihydroxy compound of the formula,

HO—Q—OH (2)

where Q is a divalent $C_{(6-30)}$ aromatic organic radical. It would be desirable therefore, to employ dihydroxymetaterephenyls of formula (1) in combination with dihydroxy aromatic compounds of formula (2) to provide additional organic polymers having improved solvent resistance.

SUMMARY OF THE INVENTION

The present invention is based on the discovery that aromatic polyesters resulting from the esterification of a mixture of a dihydroxy-meta-terphenyl of formula (1) and a dihydroxy compound of formula (2) with aromatic diacid dichlorides, such as terephthaloyl dichloride (TPDC), isophthaloyl dichloride (IPDC) or mixtures thereof, have been found to provide polyesters or polyester copolymers having high glass transition temperatures, improved solvent resistance, and stable up to 425° C. In addition, the presence of dihydroxy-meta-terphenyl units of formula (1) has been found to greatly improve the % char remaining after burning, or "char yield", as compared to conventional aromatic polyesters consisting essentially of aromatic ester units derived from the employment of IPDC, TPDC or a mixture thereof in combination with aromatic dihydroxy compound of formula (2).

STATEMENT OF THE INVENTION

There is provided by the present invention, aromatic polyesters comprising meta-terphenyl units of the formula,

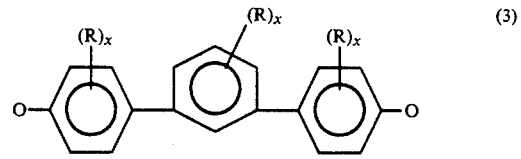
(3)

or a mixture of such units, and structural units of the formula,

—O—Q—O— (4)

chemically combined with structural units of the formula,

(5)

where R, x are as previously defined, $R^1$ is a divalent aromatic radical selected from a metaphenylene radical, a paraphenylene radical, and a mixture thereof and Q is a member selected from the class consisting of

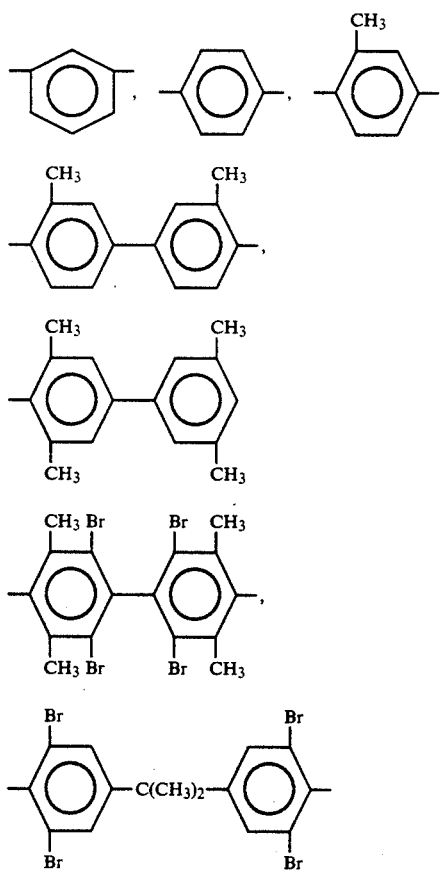

and divalent organic radicals of the general formula,

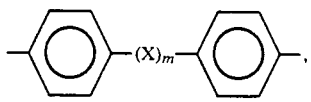

where X is a member select ed from the class consisting of divalent radicals of the formula,

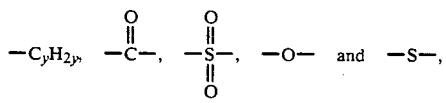

where m is 0 or 1 and, y is an integer equal to 1 to 5 inclusive.

Aromatic dihydroxy compounds which are included within formula (2) are for example,
2,2-bis(2-hydroxyphenyl)propane
2,4′-dihydroxydiphenylmethane, bis(2-hydroxydiphenyl)methane
2,2-bis(4-hydroxyphenyl)propane, hereinafter identified as "bisphenol-A" or "BPA"
1,1-bis(4-hydroxyphenyl)ethane,1,1-bis(4-hydroxyphenyl)propane,
2.2-bis(4-hydroxyphenyl)pentane,
3.3-bis(4-hydroxyphenyl)pentane,
4,4′-dihydroxybiphenyl,
4,4′-dihydroxy3,3,5,5′-teramethylbiphenyl,
2,4′-dihydroxybenzophenone,
4,4′-dihydroxydiphenylsulfone,
2,4′-dihydroxydiphenylsulfone
4,4′-dihydroxydiphenylsulfoxide,
4.4′-dihydroxydiphenylsulfide, hydroquinone, resorcinol,
3,4′-dihydroxydiphenylmethane,
4,4′-dihydroxybenzophenone, and
4,4′-dihydroxydiphenylether.

The dihydroxy-m-terphenyl polyesters of the present invention are preferably made by an interfacial polymerization technique. The dihydroxy aromatic reactant of formula (1), or a mixture of such reactant, in combination with the dihydroxy compound of formula (2) is preferably agitated in the presence of an aqueous base, such as an alkali metal hydroxide in combination with a surfactant. A solution of aromatic diacid dichloride, or mixture thereof can be added in an appropriate inert organic solvent, such as chloroform, to the basic dihydroxy aromatic compound mixture along with agitation such as stirring Equal molar amounts of aromatic diacid and dihydroxy aromatic compound, or mixture are preferably used at a temperature of 0° C. to 30° C.

Recovery of aromatic polyester can be achieved by effecting precipitation of polyester from the reaction mixture with a precipitating solvent such as methanol or acetone.

Depending upon the mole percent ratio of formula (1) and formula (2) reactants used during polyester formation, the resulting polymers can be converted to brittle or semi tough films which can be opaque or hazy resulting from crystallinity of the polymer.

Char yield has been identified as an important factor in the evaluation of the properties of the aromatic polyesters of the present invention particularly with respect to flame retardance. As used hereinafter, char yield means the weight % of residue remaining upon termination of the complete burning of the aromatic polyester being evaluated. Char yield can be measured by weighing the % residue after complete burning of a compressed powder of the aromatic polyester placed 2 inches from a radiant heat panel providing at least a 3.5 watts/Cm² heat flux . In measuring char yield, a radiant heat source setting of 80 or 90 volts corresponding to 6.5-7.5 watts/Cm² heat flux can be used depending upon what is needed to sustain combustion.

The following examples are given by way of illustration and not by way of limitation. All parts are by weight.

EXAMPLE 1

Several polyester copolymers were prepared from dihydroxy-meta-terphenyl (DHMTP), bisphenol A, (BPA) and isophthaloyl diacid dichloride (IPDC) using the interfacial polymerization method. A blender was charged with 1.311 g (5.0 mmol) of DHMTP, 1.141 g (5.0 mmol) of BPA, 40 mL (19.9 mmol) of 0.499N sodium hydroxide aqueous solution and 40 mL of water. The solution was stirred on low speed for 20 minutes and 60 mg (0.21 mmol) of sodium dodecylsulfate was added and stirring continued for 5 additional minutes. A solution of 2.030 g (10.0 mmol) of IPDC and 40 mL of chloroform was added and the stirring was increased to a moderately fast speed for 20 minutes. There was then added 100 mL of acetone to coagulate the product. The resulting precipitate was filtered and dried in vacuo at 150° C. for 15 hours. There was obtained an 83 to 93% yield of product. Based on method of preparation, the product was a polyester consisting essentially of equal molar amounts of dihydroxymeta-terphenyl units and bisphenol A units condensed with isophthaloyl units. The polymers were analyzed by differential scanning colorimetry using a Perkin Elmer DSC-7 and a DuPont 9900 thermal gravimetric analyzer. Percent char was determined by burning a sample under a radiant heat lobe of 3.5 watts/Cm² with a continuous ignition source. The solubility of the polyester was tested by immersing the polymer in the solvent at room temperature and observing the behavior for 20 to 24 hours. The following results were obtained where DHmTP is dihydroxy-m-terphenyl, BPA is bisphenol A, and $T_m$ is crystalline melting point; Tg is glass transition temperature and the proportions of DHmTP and BPA are in moles:

TABLE 1

| DHmTP/BPA (moles) | $T_m$ | $T_g{}^a$ | % Char | 5/10/50% Wt.Loss Temp.[b] |
|---|---|---|---|---|
| 100/0 | 360° C. ($\Delta H = 40$ J/g) | 203° C. | 40% | 435/450/535 (460/475/620) |
| 95/5 | 355° C. ($\Delta H = 7$ J/g) | 201° C. | 48% | 430/450/560 (450/470/>800) |
| 75/25 | — | 189° C. | 23% | 440/450/515 (450/465/530) |
| 62.5/37.5 | — | 195° C. | 30% | 440/450/515 (450/465/655) |

TABLE 1-continued

| DHmTP/BPA (moles) | $T_m$ | $T_g{}^a$ | % Char | 5/10/50% Wt.Loss Temp.$^b$ |
| --- | --- | --- | --- | --- |
| 50/50 | — | 186° C. | 20% | 430/445/505 (450/465/510) |
| 25/75 | — | 186° C. | — | 415/430/535 (415/430/535) |
| 0/100 | 266° C.$^c$ ($\Delta$H = 5.2 J/g) | 174° C. | 15% | 425/435/475 (460/470/500) |

$^a$The $T_g$s are reported from the second heat in the DSC.
$^b$The first set of numbers were run in air; the numbers in parentheses were run in nitrogen.
$^c$Obtained from an annealed film.

EXAMPLE 2

In accordance with the procedure of example 1, a blender was charged with 2.622 g (10.0 mmol) of DHmTP, 40 mL of a 0.499N sodium hydroxide solution, 40 mL of water. The solution was stirred on slow speed for 20 minutes and 60 mg (0.21 mmol) of sodium dodecyl sulfate was added and stirring continued for 5 additional minutes. A solution of terephthalic acid dichloride 2.03 g (10.0 mmol) in 40 mL chloroform was added and the stirring was increased to a moderately fast pace for 20 minutes. There was added 100 mL of acetone and the resulting precipitate was filtered and dried in vacuo at 150° C. for 15 hours. There was obtained an 83 to 93% yield of aromatic polyester consisting essentially of dihydroxy-meta-terphenyl units condensed with terephthaloyl units. The polymer had a $T_m$ of 489° C., a $T_g$ of 184° C., a % char of 37.5% and a 5, 10, and 50% weight loss of temperature in air of 445/475/545 and in nitrogen of 455/483/644.

EXAMPLE 3

In accordance with the procedure of example 1, a blender was charged with 2.252 g (8.8589 mmol) of dihydroxy meta-terphenyl, 0.654 g (2.865 mmol) of bisphenol A, 23.5 mL (22.96 mmol) of 0.977N aqueous sodium hydroxide solution and 40 mL of water. The solution was stirred on a low speed for 20 minutes. There was then added 50 mg (0.017 mmol) of sodium dodecyl sulfate and stirring continued for 5 additional minutes. A solution of 1.163 g (5.728 mmol) of isophthaloyl diacid dichloride and 1.162 g (5.724 mmol) of terephthaloyl diacid dichloride in 30 mL of chloroform was then added. The stirring of the mixture was increased to a moderately fast speed for 20 minutes. There was then added 100 mL of acetone to effect the coagulation of product. Based on method of preparation, the product was a polyester consisting essentially of dihydroxy-meta-terphenyl units and bisphenol A units condensed with substantially an equal molar amount of isophthaloyl units and terephthaloyl units. The polyester was dried in vacuo at 150° C. for 15 hours to provide a yield of 93–99%.

Additional polyesters were prepared following the same procedure utilizing different molar ratios of dihydroxy-meta-terphenyl and bisphenol A. The polyesters were made in accordance with the procedure of example 1 and evaluated for weight loss characteristics and solvent resistance. The following results were obtained:

TABLE 2

| DHmTP/BPA (moles) | $T_m$ | $T_g{}^a$ | 5/10/50% Wt.Loss Temp.$^b$ |
| --- | --- | --- | --- |
| 100/0 | 375° C. ($\Delta$H = 40 J/g) | 182° C. | 440/460/515 (450/475/685) |
| 75/25 | | 184° C. | 440/460/510 (455/470/595) |
| 50/50 | — | 195° C. | 460/470/525 (455/465/530) |
| 0/100 | | 196° C. | 475/480/515 (490/495/525) |

$^a$The $T_g$s are reported from the second heat in the DSC.
$^b$The first set of numbers were run in air; the ones in parentheses, in nitrogen.

TABLE 3

| DHmTP/ BPA (moles) | Solubility | | | Film Quality |
| --- | --- | --- | --- | --- |
| | $CHCl_3$ | $CHCl_2 CHCl_2$ | meta-cresol | |
| 100/0 | no | no | no | brittle,opaque |
| 75/25 | swelled | swelled | no | brittle,hazy |
| 50/50 | partially | partially | no | brittle,hazy |
| 0/100 | yes | yes | yes | semi-tough |

Although the above examples are directed to only a few of the very many variables which can be utilized in the practice of the present invention, it should be understood that the present invention is directed to a much broader variety of polyesters as set forth in the description preceeding these examples.

What is claimed is:

1. An aromatic polyester comprising meta-terphenyl units of formula,

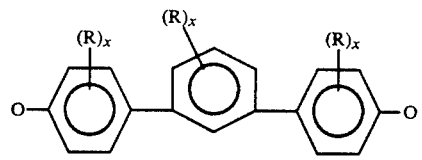

or a mixture of such units and structional units of the formula,

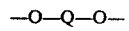

chemically combined with structural units of the formula,

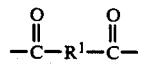

where R is the same or different radical and a member selected from the class consisting of nitro, $C_{(1-8)}$ alkoxy and $C_{(1-13)}$ monovalent hydrocarbon, Q is a divalent $C_{(6-30)}$ aromatic organic radical, $R^1$ is a divalent aromatic radical selected from the class consisting of a metaphenylene radical, a paraphenylene radical, and a mixture thereof, and x is a whole number equal to 0 to 4 inclusive.

2. An aromatic polyester in accordance with claim 1, where x is 0.

3. An aromatic polyester in accordance with claim 1, where —O—Q—O— is a bisphenol A moiety.

4. An aromatic polyester in accordance with claim 1 where $R^1$ is a metaphenylene radical.

5. A method of making aromatic polyesters comprising effecting a reaction between an aromatic diacid dichloride selected from the class consisting of isophthalic acid dichloride, terephthalic acid dichloride and a mixture thereof, and a dihydroxy compound selected from the class consisting of dihydroxy metal terphenyl of the formula,

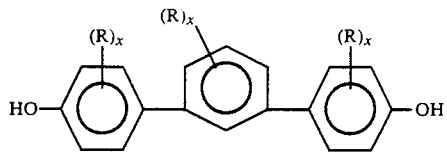

and a mixture of such dihydroxy meta terphenyl and a dihydroxy compound of the formula

HO—Q—OH where R is the same or different radical and a member selected from the class consisting of nitro, $C_{(1-8)}$ alkoxy and $C_{(1-13)}$ monovalent hydrocarbon, $R^1$ is a divalent aromatic radical selected from a meta phenylene radical, a paraphenylene radical, and a mixture thereof, Q is a divalent $C_{(6-30)}$ aromatic organic radical, and a mixture thereof, and x is a whole number equal to 0 to 4 inclusive.

* * * * *